United States Patent [19]
Mueller

[11] 3,882,515
[45] May 6, 1975

[54] SHUTTER SETTING AND FILM ADVANCING MECHANISM FOR AN ELECTRICALLY OPERATED CAMERA

[75] Inventor: Arthur C. Mueller, Niles, Ill.
[73] Assignee: Bell & Howell Company, Chicago, Ill.
[22] Filed: May 28, 1974
[21] Appl. No.: 473,528

[52] U.S. Cl. .................. 354/173; 354/204; 354/247
[51] Int. Cl. ....................... G03b 9/14; G03b 17/42
[58] Field of Search .......... 354/170, 171, 173, 226, 354/245, 246, 247, 248, 266, 204, 205

[56] References Cited
UNITED STATES PATENTS

| | | | |
|---|---|---|---|
| 3,470,803 | 10/1969 | Fukuolra et al. | 354/266 X |
| 3,762,291 | 10/1973 | Kirmura | 354/171 |
| 3,824,607 | 7/1974 | Tanaka | 354/266 X |

*Primary Examiner*—Joseph F. Peters, Jr.
*Attorney, Agent, or Firm*—John E. Peele, Jr.

[57] ABSTRACT

For a cartridge loaded, electrically operated still camera, an automatic camera mode sequencing mechanism is provided to transport the film and set the shutter following an exposure sequence. The shutter is controlled by an exposure controlling mechanism which is reset by a smaller than expected motor through a split cycle operation in which the motor alternatively drives the film transport mechanism. Through selected circuitry, the motor is energized to prepare the camera for another operation with minimum manual effort by the operator. A lock-out mechanism is provided to ensure completion of the camera "ready" cycle before another exposure sequence can be initiated.

30 Claims, 13 Drawing Figures

SHUTTER SETTING AND FILM ADVANCING MECHANISM FOR AN ELECTRICALLY OPERATED CAMERA

The present invention relates to a photographic camera, and particularly to a cartridge loaded, electrically operated, still camera. An electric motor drive provides for substantially automatic camera mode sequencing with minimum manual effort upon action of a camera actuator control. More particularly, the invention relates to a mechanism to enable efficient drive of selected camera components with a motor of smaller than expected output thereby permitting the motor and the enclosing housing to be of smaller than expected physical dimensions.

Cameras having electrically powered motors have heretofore been proposed for causing selected camera operations to be automatically sequenced. Some cameras available provide for substantially complete automation of the film transport sequence and shutter setting following actuation of the camera actuator control. That is, after the camera actuator control is depressed; the previously set shutter opens to permit a film frame to be exposed; when the shutter closes, the film is advanced to position the next frame for exposure; and the shutter is set for the next exposure. However, the motor drive for most such cameras is attached externally of the camera housing. Further, to expedite the completion of the sequence following closure of the shutter to ready the camera for the next exposure, the selected motor has generally been heavier than desired, and has required a heavier than desired power pack. That is, to maintain a minimum time for the complete ready-to-ready cycle, a high torque motor is required to enable simultaneous powering of the several driven components, including the shutter setting mechanism and the film advance mechanism. Hence, the power requirements are high, and the motor size and power pack requirements are equally high.

By the novel arrangements set forth hereinafter, a camera of small physical size is provided with the features of its much larger counterparts. The automatic film winding and shutter setting capabilities are provided with a lower power motor whereby the size of the motor is relatively small as are the requirements of the power pack.

Another aspect of the invention is a mechanism to disable selected of the otherwise automatic sequencing mechanisms until completion of other operational sequences whereby only the proper sequence of operational modes will occur regardless of intentional or unitentional actuation of the operator. Cameras having electrically powered motors have heretofore been proposed for causing selected camera operations to be automatically sequenced. Some cameras available provide for complete automation of the film transport sequence following actuation of the camera actuating button. That is, after the camera actuating button is depressed, a film frame is exposed; the film is advanced to position the next frame for exposure; and the shutter is set for the next exposure. Clearly, these several steps should be completed for the shutter is made available to be actuated to another exposure. However, although the complete cycle from ready-to-ready is extremely short, operators are often able to tap the control button whereby a second cycle is initiated before the first cycle is completed. This action may result in: jamming or damage to mechanisms of the camera; and incomplete film transport causing partial overlap of the exposure of adjacent image frames. Therefore, it is desired that this type of shortcoming be overcome by providing an interlock to preclude a second actuation of the camera control button until the first cycle has been completed. In summary, a cartridge loaded camera having an electrically powered film transport is provided with a mechanism to prevent de-actuation of the camera actuating button independent of the length of time the operator actuates the button. That is, a device is provided to maintain actuation until a previously initiated camera operation cycle is completed. An externally accessible control button is depressible to initiate camera operation. An internal lever, biased toward a lock member, is arranged to be displaced by the movement of the button. The movement removes an end lug of the lever from a finger of a pivoted multiple finger lock member which is rotationally biased by a spring member. When the lock member is freed by the lever, the spring rotates the member about the pivot to cause the finger thereof to block return of the actuator button to its operable position. The lock member remains so oriented until the camera operation cycle is completed and a component returns the lock member to a shutter release condition. Thereafter, the lever actuated by the shutter actuator button is released to permit the button to assume its operative position.

An object of the present invention is to provide a motor driven camera with an automatic shutter setting and film winding mechanism operative by split cycles to enable use of a relatively low-power, physically small motor.

Another object of the invention is to provide a shutter setting mechanism having the shutter controlled by a setting plate which is reset by a separate shutter resetting plate.

Yet another object of the invention is to provide an anti-release device for preventing actuation of the shutter following a prior actuation but before completion of a camera resetting cycle.

Still another object is to provide a cyclically operable mechanism ensuring full film frame advance and full setting of the shutter of the camera.

The above and other objects will be apparent from the description of the accompanying drawings in which like parts are designated by like numerals.

Figure 1:
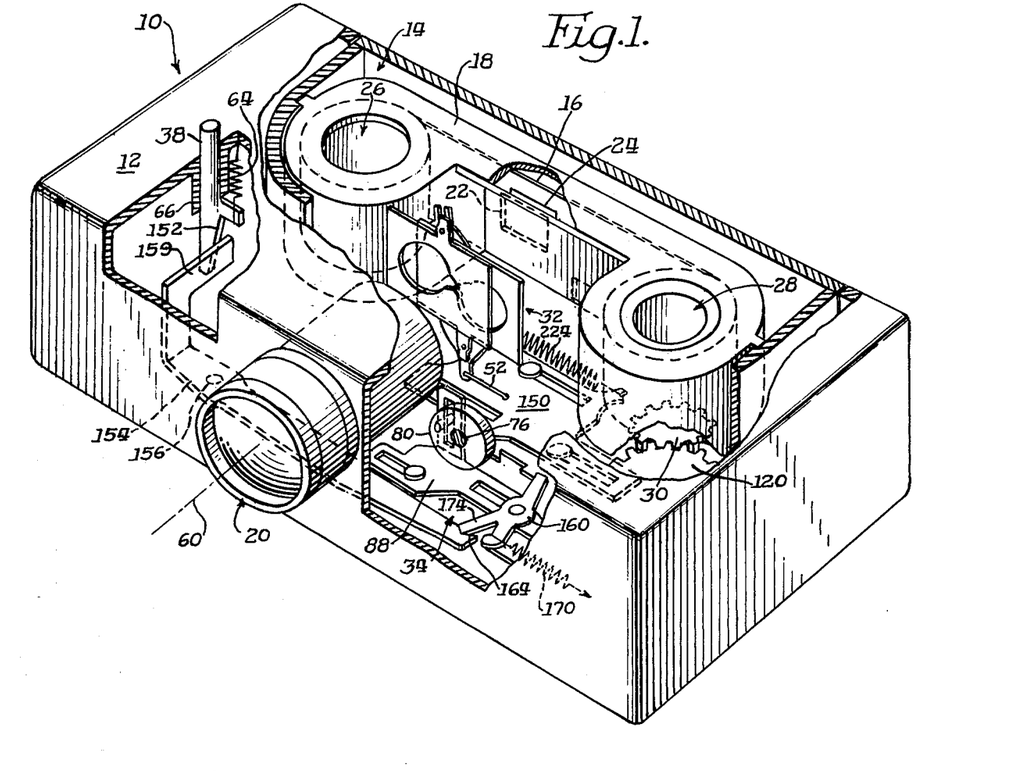
FIG. 1 is a perspective view of a camera showing primary components with which mechanisms of this invention cooperate, with parts omitted and parts broken away for clarity.
Figure 2:
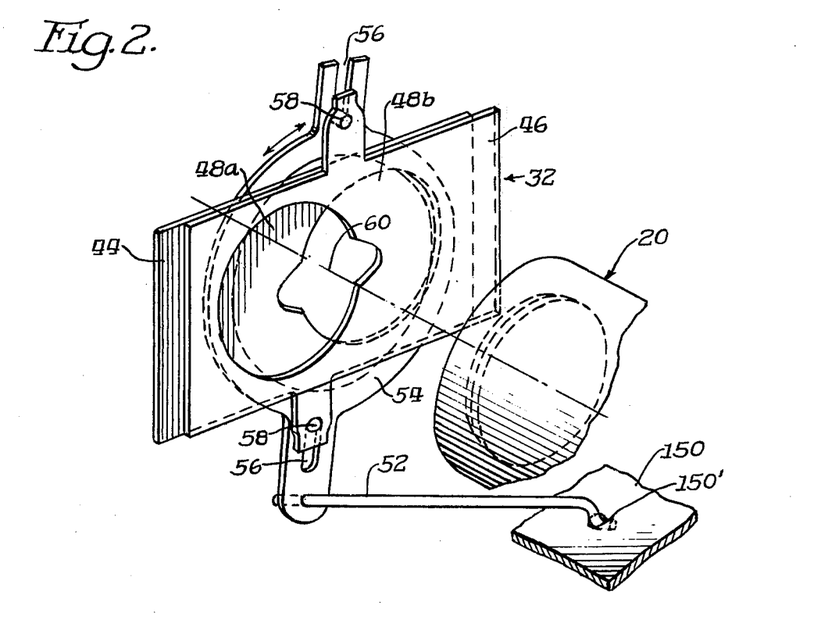
FIG. 2 is a schematic perspective view of a combined aperture-shutter assembly.

Referring now to FIG. 1 of the drawings, a camera 10 is provided generally with a housing 12. A portion of the housing defines a film enclosing chamber 14 into which can be inserted a film 16, preferably supplied in a cartridge or cassette 18. Typically, the film cassette may be of the type currently available as the 110 format. When the camera is loaded, the film is arranged in the focal plane of a focusable objective lens 20 shown substantially aligned with an exposure aperture 22 through which light passes to impinge on the film. The cassette 18 is supplied with a supply or first hub 26 and a second hub or take-up 28 between which the film is attached. The second hub, or take-up has a gear 30 which is accessible to other mechanisms of the camera for winding of the film onto that hub after an exposure sequence. Internally of the housing is an exposure control mechanism 32, which in this preferred embodiment is a combined aperture and shutter assembly for limiting the quantity of light to be permitted to impinge on the film during an exposure. Further enclosed within the housing 12 is a shutter setting assembly and film winding mechanism 34 powered by a motor 36 shown more particularly in FIG. 13. Operation of the camera is initiated by an externally accessible camera actuator control, shown as button 38, which is coupled to mechanisms internal of the camera for initiating a film exposure sequence.

Figure 12:
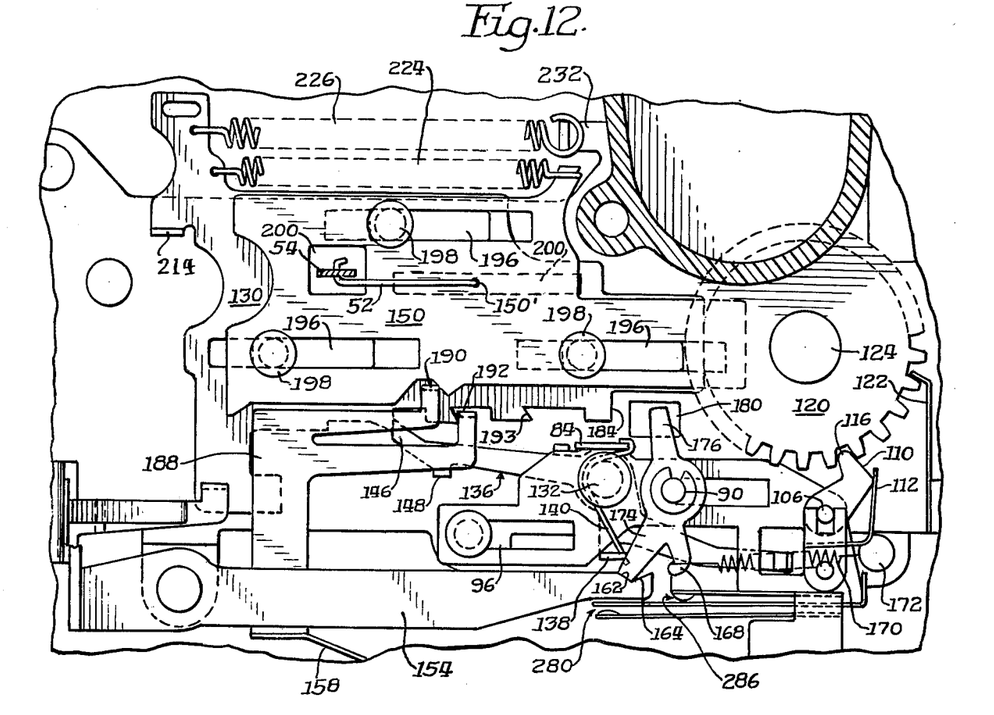

As shown in FIG. 12, the aperture-shutter assembly 32 includes a pair of relatively movable opaque plates or blades 44, 46 provided with cooperating apertures 48a, 48b of dimensions determined by the focal cone of the objective lens 20 and the area of film frame 24. A control rod 52, coupled at one end to one of the devices of the exposure control mechanisms of the camera, is arranged to cause simultaneous relative displacement of the shutter blades. The control rod 52 is connected at its other end to an extension of a rotatable aperture-shutter blade driver ring member 54. This ring member is provided with slots 56, 56 into which a coupling pin 58 of each of the drivable aperture-shutter blades 44, 46 is respectively seated. When the ring member 54 is rotated by action on the control rod 52, and responsive to the extent of movement of the rod, the blades are displaced relative one another by proportional amounts. Before and after an exposure, when the shutter is closed, the blades are displaced with the apertures 48a, 48b of each blade blocked by solid portions of the other blade. For exposure, the control rod drives the blades to align a portion of the apertures of both blades about an optical axis 60 to define a predetermined aperture opening for a predetermined period of time. Thereafter, the blades are returned to their aperture blocking conditions whereby exposure is terminated.

The assemblies and mechanisms of the camera, including electrical and mechanical interconnections, provide for essentially automatic completion of camera operation once the cycle is initiated by the actuator control 38. The motor 36 is powered by a small power source, such as a small battery pack 62 (shown in FIG. 8) and is interconnected with several control circuits, described hereinafter and also seen in that figure. Hence, the motor is energized at selected times during the operational sequence when mechanisms are to be driven. For example, following insertion of film 16 in the film chamber 14 of the camera, the motor is energized to locate the first film frame 24 for exposure and to insure that the aperture-shutter assembly 32 is set for an exposure. To take a picture, the user needs only depress the camera actuator button 38 which by spring 64 is biased through a guide 66 in the housing 12. The actuator button energizes selected circuits of the camera and enables sequential opening and closing of the aperture-shutter according to the requirements established by light responsive exposure control circuitry 68. Upon completion of the exposure, several electro-mechanical connections internally of the camera enable energizing of the motor for transporting of the film to position the next frame for exposure and simultaneously for setting of the shutter for that exposure. Thereafter, through similar connections, completion of these functions causes de-energizing of the motor with the camera in the ready or set condition for the next use.

Figure 7:
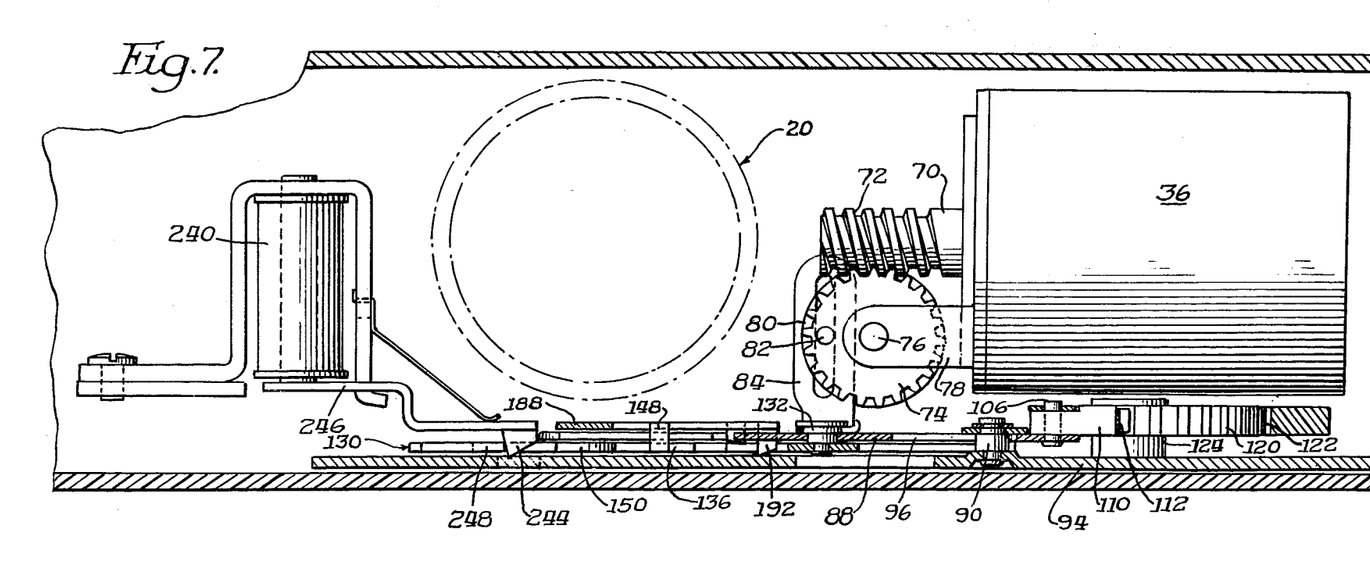
FIG. 7 is an elevational view of some of the mechanisms according to this invention as taken along line 7—7 in FIG. 9.
Figure 13:
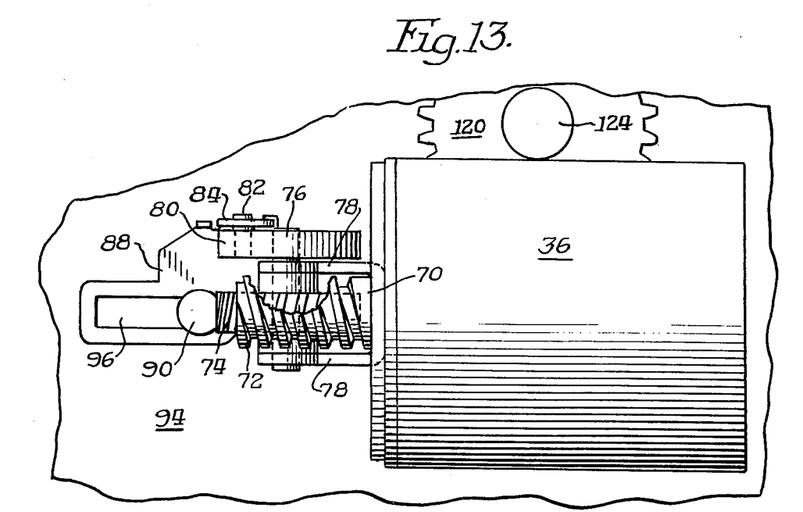
FIG. 13 is a plan view of the mechanical motor drive connection.

The motor 36, selected as a small DC or battery powered unit, has limited torque output through a rotatably drivable shaft 70. As seen in FIGS. 7 and 13, on the remote end of the shaft is formed a worm gear 72 which drives a gear 74 fixedly mounted on axle 76 which is bearingly supported in ears 78, 78 which extend outwardly from the motor housing to which they are fixed. A disc 80 is fixed to axle 76 with a pin 82 fixed therein radially displaced from the axle about which the disc rotates. The pin 82 provides an eccentric connection to transmit power from the motor 36 to a drivable yoke member 84. The yoke member extends upwardly from the base of a drive plate 88 which is supported for sliding movement relative to a pair of studs 90 fixed in the mechanism support plate 94 of the camera as further shown in FIGS. 9 and 12. The studs pass through elongated slots 96 in the drive plate 88 to limit the excursion of the plate as the yoke member 84 is shifted reciprocably due to rotation of the eccentrically arranged pin 82 of the rotatably drivable disc 80.

Figures 5, 6:
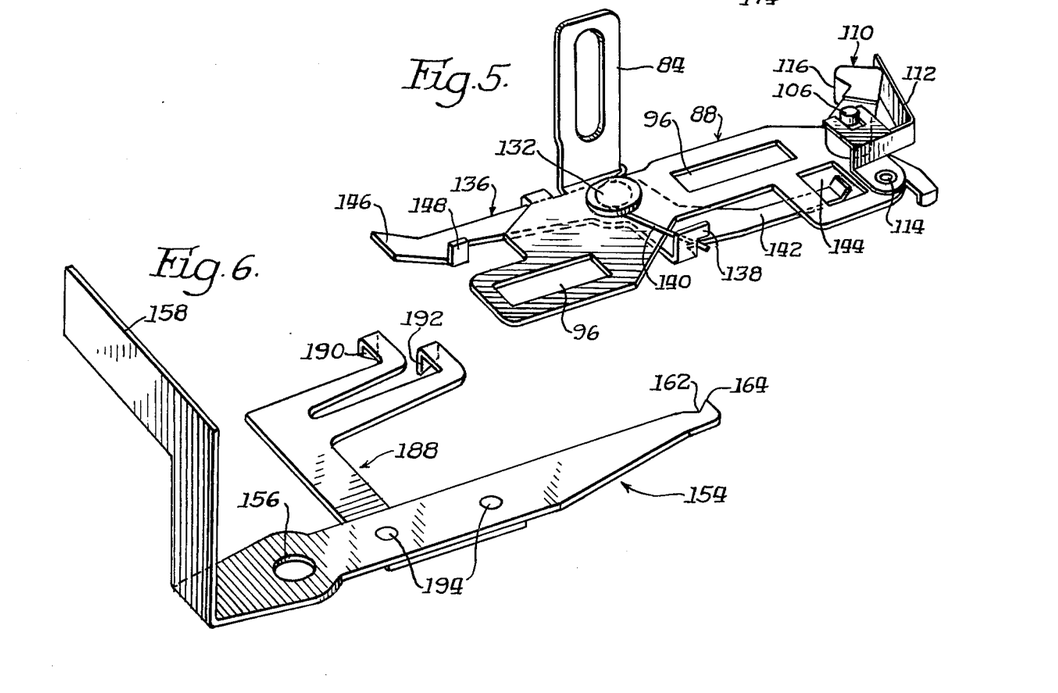

Referring now to FIG. 5, the elongated drive plate 88 is seen to support a pin axle 106 adjacent one end thereof. About the axle, a shaped gear drive member 110 is supported for pivotal movement influenced in part by a small formed leaf spring 112. The leaf spring is fixed to the drive plate 88 by a rivet 114 with the leaf portion of the spring engaging the back side of the gear drive member 110. As shown, the leaf spring 112 biases the gear drive member in a counterclockwise direction about the pin axle 106 so as to urge the tooth shaped first edge 116 between teeth of a take-up driving gear 120. During a reciprocation cycle of the drive plate 88 to the right as viewed in FIG. 9, the plate causes the gear drive member 110 to engage and rotate the take-up driving gear 120 by a few degrees. Thereafter, the drive plate 88 is cycled to the left to the orientation as shown. During the cycle to the left, the tooth 116 of the gear drive member 110 cams over the adjacent gear teeth of the driving gear 120 to begin a new cycle. Another leaf spring 122, fixed to the mechanism support plate 94, has a driving gear engaging portion for restraining the gear against reverse rotation as the gear drive member is cycled. Spring 122 further prevents clockspringing of film wound about the take-up hub 28.

The take-up driving gear 120, driven intermittently upon reciprocation of the drive plate 88, is rotatable about an axis defined by shaft 124. Further, this gear is arranged to extend a small amount into the film cartridge receiving chamber 14 for meshing with the take-up gear 30 of a cartridge located in the chamber. During each stroke of the drive plate, the driver member 110 rotates the driving gear approximately 30° to in turn rotate the film take-up hub for winding up a length of film. The gear ratio of the take-up gear 30 and the take-up drive gear 120 is selected such that several cycles of the drive plate 88 are required for transport of each film frame sufficiently for positioning of an unexposed film frame 24 in the exposure aperture 22 of the camera. In this preferred embodiment, three half cycles of the drive plate 88 are required to transport a full frame of film, although the drive plate is designed to be cycled less than three times to complete other powered functions.

Figure 9:
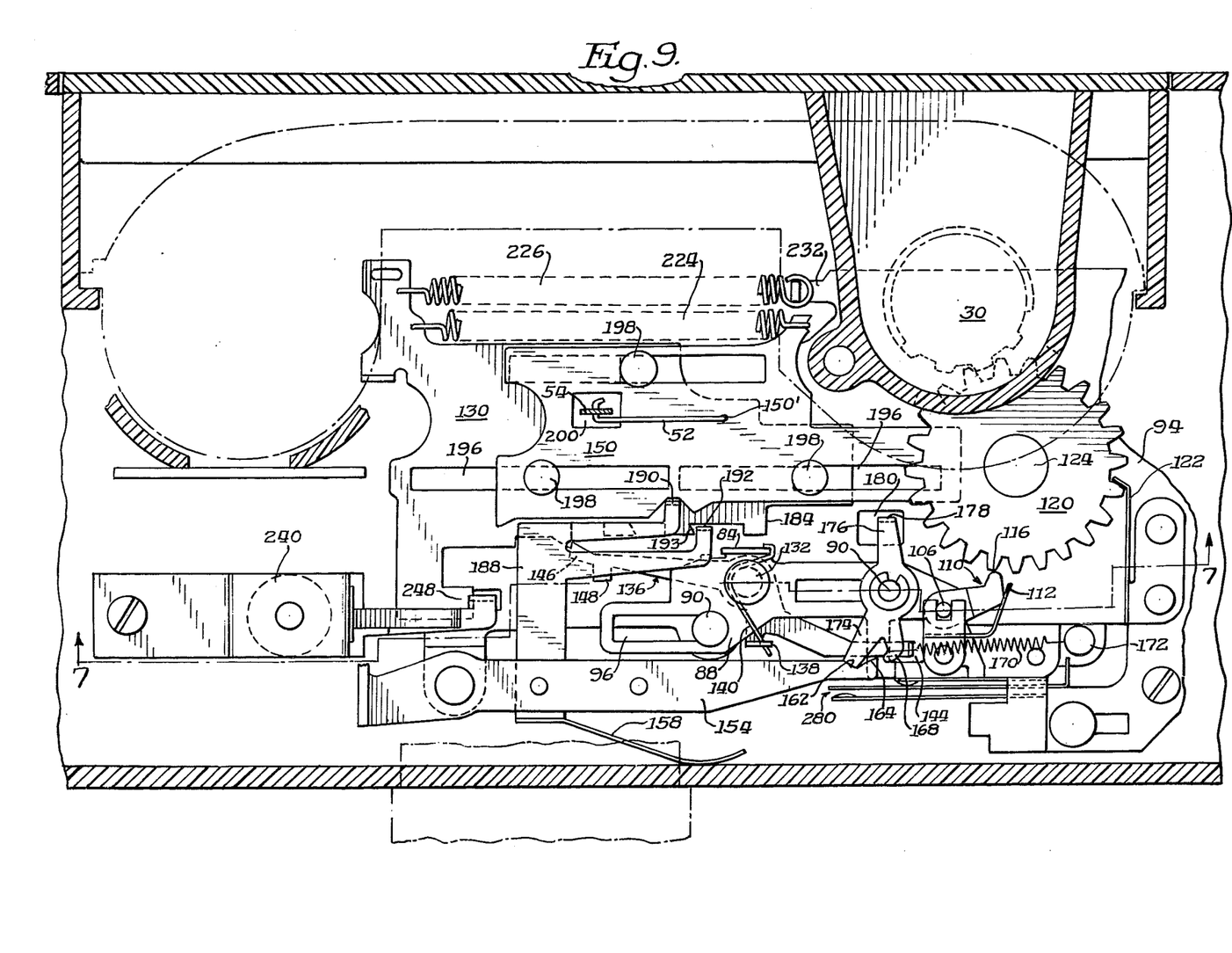
FIGS. 9–12 are plan views of the shutter setting and film winding mechanism according to the invention with parts displaced to show positions during the sequence of movement of certain components.

The split cycle of operation of the yoke member 84 is divided such that power from the motor 36 drives the take-up gear 30 only when the yoke is moving the drive plate 88 toward the take-up, i.e. to the right in FIG. 9. During the balance of the yoke-drive plate reciprocation cycle, i.e. to the left in FIG. 9, the power from the output of motor 36 is used to drive a shutter setting plate 130. Attached to the drive plate 88 about a rivet 132 defining an axis of rotation therefor is a ratchet lever 136. An upright leg 138, extending from a main portion of the ratchet lever, is engaged by an end of a wire spring 140. The lever has an elongated leg portion 142 extending to the right of rivet 132. This leg portion cooperates with a cut-out 144 in the drive plate 88 to limit the extent of arcuate movement of the ratchet lever 136 about the axis through rivet 132. Another portion of the wire spring 140 is arranged about the rivet 132 so that another leg of the spring engages a portion of the drive plate 88 to bias the ratchet lever in a clockwise direction as shown in FIGS. 5 and 9. A shutter setting plate holding tooth 146 is provided on another leg of the ratchet lever 136 for selective engagement with the shutter setting plate 130. A lug 148 extends upright from the lever to cooperate with other mechanisms as described later. During reciprocation of the drive plate 88, the shutter setting plate is displaceable by steps from a fired position into a set position (as shown in FIG. 9) in which it is latched mechanically or electromechanically until released to again reset a shutter control plate 150. Thus, the two functions requiring power from the motor 36, film transporting and shutter setting, are divided so that the maximum power output of the motor needs to be sufficient only to meet the requirement for the larger power consumer rather than the added requirements of both functions.

The camera control button 38 shown schematically in FIG. 1 passes through the guide 66 in the housing 12, and is continuously biased toward the inoperative position by the spring 64. Internally of the housing in the shown embodiment, a tapered portion 152 of the button cooperates with a pivoted link member 154. The link member is arranged for short stroke pivotal movement about a fixed axle 156 and is normally urged into a ready position by a yieldable member 158, as shown in FIG. 9. Upon depression of the button 38 for camera actuation, the link member 154 is caused to pivot about the fixed axle 156 on which the link member is supported to the mechanism support plate 94. The pivoting action occurs as the tapered portion 152 of the button 38 engages an offset tail and 159 of the link member to push the same about an axle 156. Adjacent a lock out member 160 and on the opposite end of the link member proximate a holding corner 162 is formed a lock-out member engaging toe portion 164. Broadly, the toe portion 164 and the lock-out member 160 cooperate to enable control button actuation at any time other than during an exposure and camera resetting cycle as will be more fully described hereinafter.

Figures 3, 4:
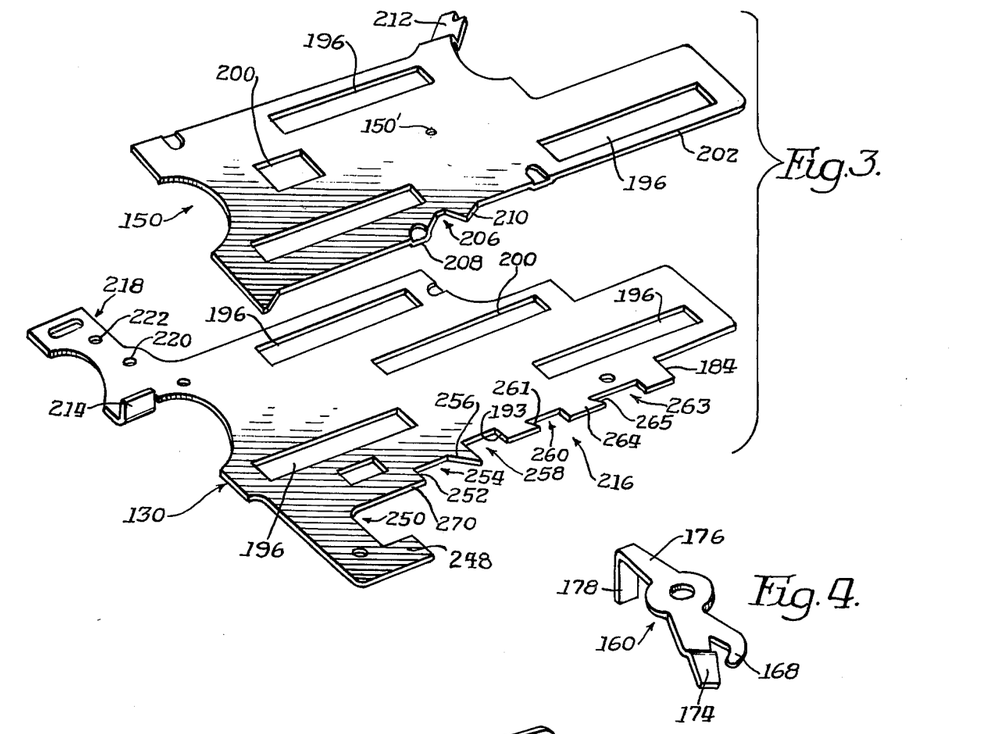
FIGS. 3–6 are perspective views of components of the novel mechanisms.
Figure 10:
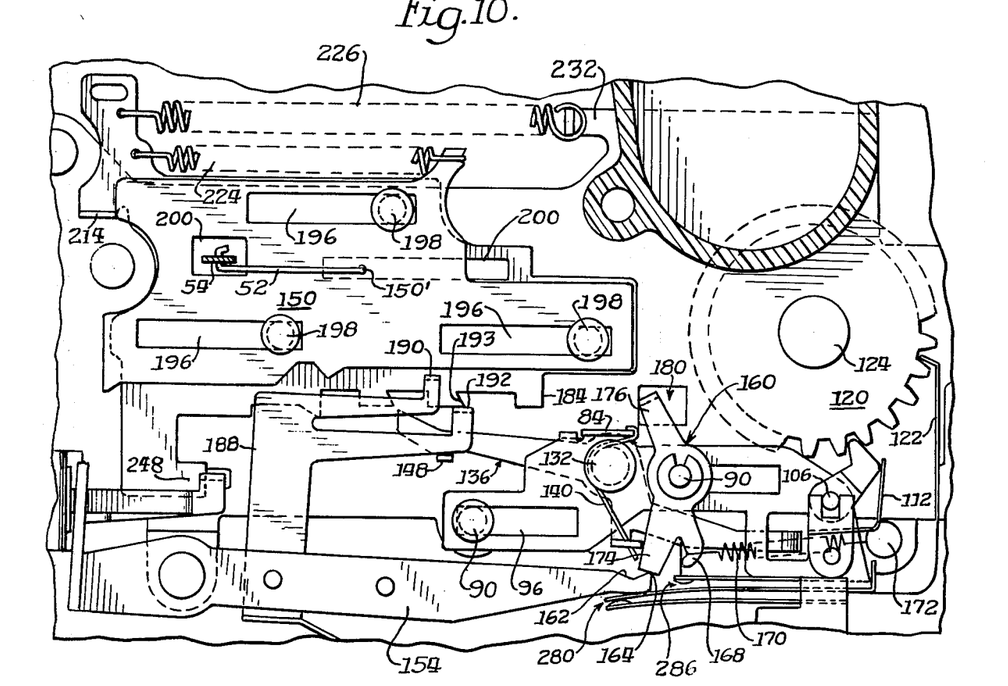

The multi-fingered lock-out member 160 of FIG. 4 is supported for rotational movement about an axle shown as one of the studs 90 relative to which the drive plate 88 is reciprocable. To one finger 168 of the lock-out member is attached a coiled spring member 170, which is attached at its other end to a spaced stud 172. The spring member 170 urges the lock-out member to rotate counter-clockwise from the orientation as shown in FIG. 9 to the orientation of FIG. 10. Adjacent the spring coupled finger 168 of the lock-out member is a link engaging finger 174 against which the toe portion 164 of the link member 154 rests when in the camera actuated condition, as shown in FIG. 10. In the alternative position of the link member following completion of an exposure as shown in FIG. 9, the link is in an operative condition and permits depression of the control button to start a camera operation cycle. However, in the former position intermediate an exposure sequence, the link engaging finger 174 is oriented from the holding corner 162 of the link member into alignment with the toe portion 164 of the link member 154 so as to block return of the link member from the camera operating condition. The third finger 176 of the lock-out member extends from the side of the member substantially opposite the side from which the first two fingers extend. This third finger is formed with a leg 178 (See FIG. 4) bent from the plane of the member to intersect the path of movement of the shutter setting plate 130, and to pass through a cut-out 180 in the mechanism support plate 94 which limits the pivoting action. Upon release of the link member 154 during a camera operating sequence, the lock-out member under the biasing of spring 170 is rotated to cause the leg 178 in the cut-out 180 to engage an edge of the support plate. This position of the lock-out member is retained until the exposure is completed and the shutter setting plate 130 moves to the position of FIG. 11. A ledge portion 184 of the shutter setting plate is designed to engage the leg 178 of the lock-out member only during the latter portion of movement of the setting plate to its fired position. When the member is engaged by the ledge, the member is pushed clockwise by a few degrees so as to displace the link engaging finger 174 from the toe of the link member 154 and into alignment with the reduced corner section adjacent the toe. Thereafter, the lock-out member is held by the shutter setting plate 130 against movement which might be caused by the spring 170. The time frame following displacement of the lock-out member back to a "ready" condition and before actual camera "ready" is sufficiently short in practice (less than one second) as to negate the probability of manual re-actuation of the camera before actual camera "ready" occurs. Further, in that the intermediate condition time frame is of still shorter duration, an intentional effort to defeat the lock-out made would fail due to the requirement that actuation must occur at a precise instant following an earlier actuation.

Fixed to the link member 154 for movement therewith is a plural-tongued plate holding spring member 188. As shown in FIG. 6, the spring member with a pair of offset tongues 190, 192 formed therefrom is attached to the link member as by rivets 194. Each of the tongues is angled to provide ramps by which the tongues can lift over cooperating components when caused to yield. The corners, however, prevent inadvertent movement of the components. The spring member 188 is offset from the axis of rotation of the link member to provide relatively greater movement of the tongues than the comparatively limited arcuate movement of the link member.

The shutter operating assembly includes the shutter control plate 150 to which the shutter control disc 54 is connected by the control rod 52 passing through a receiving hole 150' in the plate. Cooperating with the shutter control plate is the shutter setting plate 130 which under conditions recited hereinafter drives the shutter control plate 150 from a fired or shutter open orientation to a set or shutter closed orientation. Both plates are provided with elongated slots 196 permitting slidable movement on the mechanism support plate 94 relative to several headed rivets 198 which pass through the slots. Additional cut-outs 200 are provided in both plates to provide clearance as required for the lower end of the control disc 54 and the coupling of the control rod 52. The shutter control plate 150 is of modified rectangular configuration as shown in perspective at the top of FIG. 3. Along one edge 202, a notch 206 is formed in the plate in a position defining a limit of reciprocation of the plate in one direction. As viewed in plan, the notch includes a flat between a ledge 208 and a triangularly shaped portion 210 raised from the edge. From the opposite edge of the plate 150 is bent a spring attaching tab 212.

Figure 11:
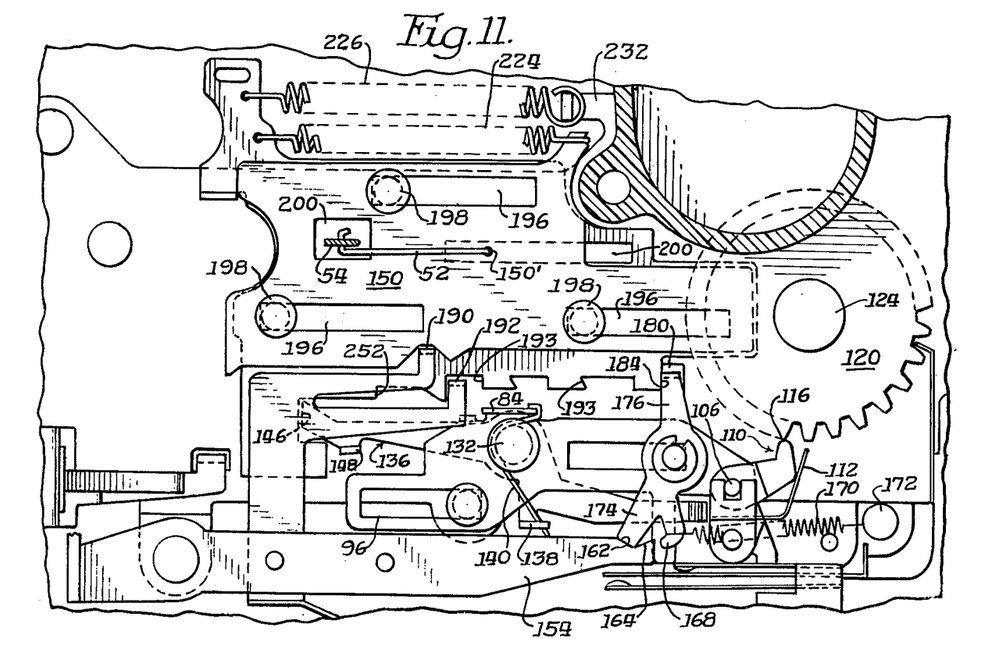

The shutter setting plate 130 shown at the bottom of FIG. 3 has formed from the major portion thereof a bent-up tab 214 which can selectively engage and push the shutter control plate 150 during a shutter closing operation. Along the forward edge 216 of the setting plate is formed a series of notches, edges and ramps with which position and holding components cooperate. Extending from the edge opposite this notched edge is an arm 218 having first and second receivers 220, 222 into which ends of a pair of coiled springs 224, 226, are respectively attached. The other end of the one spring 224 is attached to the tab 212 of the shutter control plate 150 while the other end of the spring 226 is attached to a lug 232 on the mechanism support plate 94. Depending on the positions of the shutter control plate and the setting plate relative to one another and to the mechanism support plate, the coiled spring 226 may be tensioned to bias the slidable setting plate for movement to the right from the set positions as shown in FIGS. 9 and 10. Similarly, when in a set condition as in FIG. 9, the spring 224 is tensioned to bias the shutter control plate to the left. At the end of a shutter operation sequence, the tension forces stored in springs 224 and 226 have been expended as shown in FIG. 11, awaiting reset of the shutter control plate.

FIG. 9 shows the shutter setting and film wind mechanisms in the initial or set condition in which the camera is stored between exposures. As shown, the shutter control plate 150 is displaced to the right and tensioned by spring 224 for movement to the left when released. In this set condition, the shutter 32 is closed through the connection of the control rod 52 with the control plate 150. The first tongue 190 of the holding spring 188 engages the notch 206 in the forward edge of the shutter control plate to mechanically restrain the plate from movement until the camera control button 38 is actuated. The second tongue 192 of the holding spring 188 engages a ledge 265 of the setting plate to retain same in the set position.

Upon actuation of the camera control button 38, the cam surface 152 thereof causes link member 154 to pivot about axis 156 to cause the tongue 190 of the holding spring 188 to be displaced arcuately thereby releasing the mechanical latch which until release has held the shutter control plate 150. Under the urging of the spring 224, the shutter control plate 150 is moved rapidly to the left thereby driving the shutter 32 to an open condition by the connection with control rod 52. The extent of movement can be limited by electromechanical connections with the exposure control system but the movement may be a maximum amount as represented by the position in FIG. 10. At this orientation, the shutter 32 is open so that light rays can impinge on the film. The period of the exposure is determined by the exposure control system 68 responsive to the quantity of light reflected from the subject being photographed.

As the tongue 192 is displaced simultaneously with displacement of tongue 190 upon camera actuation, the lug 148 extending upright from the ratchet member 136 is engaged by the tongue 192 to pull the ratchet member end 146 out of engagement with the setting plate 130 to permit its movement. However, as the control plate 130 is released, a solenoid 240 is simultaneously energized to prevent immediate movement of the setting plate to a shutter closing condition. Energizing of the solenoid by control circuitry 242 discussed in more detail hereafter causes a plate latching member 244, formed from the clapper 246 of the solenoid and shown in FIG. 7 to engage an arm 248 on the setting plate as shown in FIGS. 9 and 10. Thus, the setting plate is restrained against movement until the exposure control system indicates that an adequate quantity of light for proper exposure has impinged on the film and exposure should be terminated. At this time, the solenoid is de-energized to release the setting plate for movement to the right from the position of FIG. 10 under the action of the spring 226. By engagement of the return lug 214 of the setting plate against the shutter control plate, both plates are moved to the right to the orientation as seen in FIG. 11. This action causes the shutter 32 to be closed blocking further light from reaching the film. Upon being displaced to the shutter closed condition, the shutter control plate is held in that condition as tongue 190 seats in notch 206 with adequate force to prevent movement of the plate as spring 224 is tensioned for the next operation. Through the above described time frame in a camera operation cycle, the motor has remained de-energized since the last cycle at which time the film was wound and the shutter setting plate returned to the set orientation.

Figure 8:
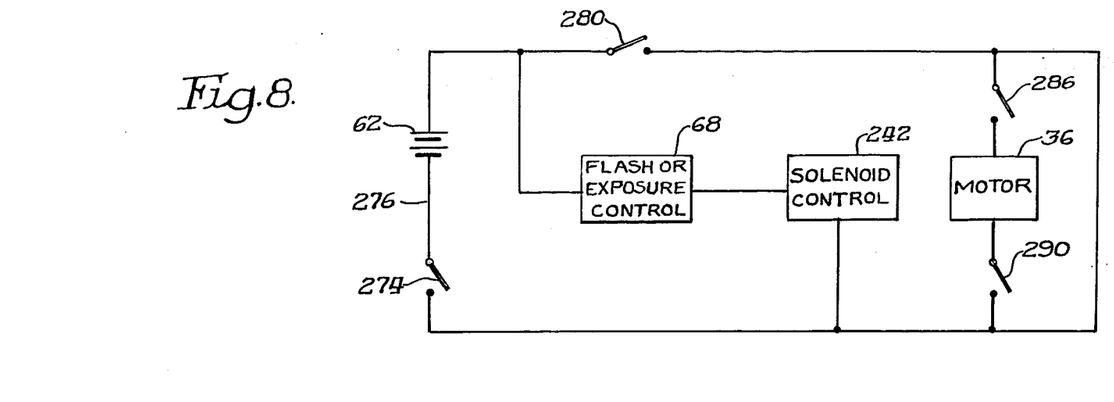
FIG. 8 is a schematic view of principle components of the circuits associated with the mechanism of the invention.

An exposure of a film frame having been completed upon closing of the shutter 32, the next film is to be positioned at the exposure aperture 22 of the camera. By the circuitry of the camera as shown in FIG. 8, the motor 36 is energized. Through the scotch yoke member 84, the drive plate 88 is moved from its last orientation to initiate winding of film 16 and setting of the shutter control plate 150. Assuming the first movement of the drive plate 88 is to the right from the orientation as shown in FIG. 11, the drive plate rotates the take-up to move film by an increment of the frame length. During movement of the drive plate to the right, the plate causes the foot 146 of the ratchet lever 136 to be displaced from the free space 250 along the edge of the setting plate 130 toward the ledge 252, and into the next notch 254, formed with the tapered edge of the wedge 256. The location of the foot 146 in the notch 254 occurs since the ratchet member is under slight yieldable pressure via the spring 140 which has enough tension to hold the setting plate 130 in position when engaged by the end portion of the ratchet member. As the direction of motion of the drive plate reverses, the foot 146 of the ratchet lever 136 engages the ledge 252 of the setting plate and pushes the plate to the left by the length of the stroke. During the movement to this intermediate orientation, the tongue 192 of the spring 188 is cammed over the lip 193 between the first notch 258 and a second notch 260. In this orientation, the setting plate 130 is held in position against the tension of spring 226 by the location of the squared edge of tongue 192 against ledge 261 of the second notch until another cycle of the drive plate 88 is continued with a rightward movement of the plate causing an additional increment of film to be transported. Simultaneously, the foot 146 of the ratchet lever 136 is cammed from the notch 254, over the tapered edge of wedge 256 and into the next adjacent notch 258. Simultaneously, the tongue 192 cams from notch 258 over a ramp 264 into the next notch 263 in which it is positioned to engage another edge 265 of the setting plate so as to prevent release of the plate when the ratchet member is again cycled.

The next cycle of the drive plate 88 causes the toe 146 of the ratchet lever 136 to push the setting plate 130 from the intermediate orientation of FIG. 12 to the full set position of FIG. 9. Until the full film frame is advanced, the drive plate is cycled with the ratchet member sequentially driving the take-up 28 and thereafter pushing the setting plate 130. When the setting plate is fully displaced, no other tooth of the setting plate is available to the ratchet member. Thus, the drive plate 88 cycles free during this portion of the stroke cycle since the tooth 146 moves in the space above the notch 258 and the lip 193 of the plate beyond the last ratchet step. Hence, the film winding and the shutter setting are in full readiness for the next camera operation.

Referring now to FIG. 8, the operating circuitry of the camera is shown. As hereinbefore mentioned, the camera is powered by a power supply shown as the battery pack 62. A safety interlock shown as a master "on-off" switch 274 is interposed in the main power supply line 276 to prevent waste of battery power during storage conditions. Switch 274 may be combined with or in addition to selected safety interlocks interposed in the circuitry to prevent inadvertent actuation of the camera, as when no film is in the film supply chamber 14. An actuator control operated switch 280 is arranged to enable energizing of the solenoid control 242 upon actuating the camera to initiate an exposure. By cooperation of the link member 154, the contacts of the switch 280 are mechanically closed when the actuator button 38 is operated. This circuit holding means maintains the circuit through the solenoid 240 until the solenoid control 242 operated by the exposure control 68 determines exposure has occurred. Upon completion of the exposure as indicated by translation of the shutter setting plate 130, the circuit through the contacts of switch 280 is opened and the motor enabling circuit through the contacts of switch 286 is closed. By not shown mechanism, the perforation sensor switch 290 is closed until the motor has advanced enough film to cause the sensor to acquire a new perforation and open the circuit. At this time, the motor is de-energized until the camera actuator control 38 is again operated.

In summary, a relatively compact camera is operable on a substantially automatic basis with the operator required to perform few manual operations. That is, after loading a film supply in the camera and focusing, if desired, the operator can expose each film frame by merely actuating the camera control button. Following each actuation, exposure occurs, film is advanced, the shutter reset for another operation and the powered components of the camera de-energized. Intermediate the operational sequence, the lock-out member precludes re-actuation of the camera. Thereafter, the camera is ready for another operation.

While this invention has been particularly shown and described with the preferred embodiment, it will be understood that various changes and modifications may be made without departing from the spirit and scope of the invention.

What is claimed is:

1. For a photographic camera having a film transport mechanism and an exposure controlling mechanism including a shutter, the improvement in a drive control system comprising:
   drive motor means;
   power supply means for energizing said motor means;
   circuit means coupled to said power supply means for selectively energizing said motor means;
   drive plate means cyclically drivable by said motor means;
   film transport means operatively coupled to said drive plate means for actuation during part of the operative cycle of said drive plate means;
   shutter setting drive means operatively coupled to said drive plate means for action during another part of the cycle of said drive plate means;
   said film transport means and said shutter setting drive means being actuated independently during the parts of said cycle whereby said motor means drives only one of said means at a time.

2. The improvement in the drive control system of claim 1 wherein said drive plate means is reciprocably cycled by said motor means; and said film transport means is driven during reciprocation of said drive plate means in one direction, and said shutter setting drive means is driven during reciprocation of said drive plate means in the other direction.

3. The improvement in the drive control system of claim 1 wherein said motor means powers said drive plate means by a yoke mechanism and an eccentric drive coupling causing said drive plate means to be reciprocably cycled.

4. The improvement in the drive control system of claim 1 wherein the film is supplied to the camera in a cartridge having a take-up and a take-up gear and said film transport means includes a drivable gear with which the take-up drive gear meshes when the cartridge is seated in the camera; and said drive plate means includes uni-directionally operable driver means for powering said drivable gear.

5. The improvement in the drive control system of claim 4 wherein the operable driver means is pivoted to said drive plate means, and is continuously biased toward engagement with said drivable gear.

6. The improvement in the drive control system of claim 1 wherein the shutter setting drive means includes a shutter setting plate displaceable from a fired position to a set position and means driven by said drive plate means to intermittently displace said shutter setting plate from said fired position toward and to said set position.

7. The improvement in the drive control system of claim 6 wherein said shutter setting plate drive means driven by said drive plate means is a reciprocably actuated pusher means biased toward engagement with said shutter setting plate means, and said shutter setting plate means includes engageable surfaces by which said plate means is displaced a predetermined amount.

8. The improvement in the drive control system of claim 1 wherein the camera includes an actuator means for actuating said exposure controlling mechanism, the improvement comprising:
means releasable by said actuator means to preclude re-actuation of said actuator means during a predetermined camera operation sequence; and
means driven by said drive control system to reset said releasable means to permit another actuation of said actuator means.

9. The improvement in the drive control system of claim 8 wherein said releasable means is a lock-out member, and said shutter setting drive means includes a shutter setting plate for resetting said lock-out member for actuation of said actuator means.

10. The improvement in the drive control system of claim 9 wherein said actuator means includes an actuator control and a link member positionable in an actuator control operative condition and an actuator control non-operative condition, and said lock-out member when released restraining said link member in said actuator control non-operative condition until reset.

11. The improvement in the drive control system of claim 9 wherein said shutter setting plate is displaceable between a fired position and a set position and said lock-out member is engaged by said setting plate when said setting plate is displaced to said fired condition to move said lock-out member to an actuator means reset condition.

12. The improvement in the drive control system of claim 1 wherein the exposure controlling mechanism of the camera includes a shutter control plate for driving the shutter and a shutter setting plate for resetting said shutter control plate responsive to intermittent engagement by said plate means when cycled by said motor means.

13. The improvement in the drive control system of claim 12, the camera including shutter release means permitting movement of said shutter control plate from a set condition to a fired condition, the improvement including means operative after release of said shutter release means for preventing another actuation of said shutter release means until said shutter resetting means is re-conditioned for another camera operating sequence.

14. The improvement in the drive control system of claim 13 wherein said actuation preventing means includes a lock-out member movable between a first orientation and a second orientation, and includes means biasing said lock-out member from said first orientation to said second orientation, and means responsive to displacement of said shutter setting plate means for displacing said lock-out member back to said first orientation against the action of said biasing means.

15. For a photographic camera having a mechanism for winding a length of film and a mechanism for setting a shutter means following exposure of a film frame, the improvement in a drive assembly for powering the mechanism comprising:
an electric drive motor;
circuit means including a power source for selectively energizing said drive motor;
reciprocable drive plate means cyclically drivable by said drive motor;
first operating means on said drive plate means to drive said film winding mechanism during reciprocation of said drive plate means in a first direction; and
second operating means on said drive plate means to actuate said shutter setting mechanism during reciprocation of said drive plate means in a direction opposite said first direction
whereby said film winding mechanism and said shutter setting mechanism are actuated independently during each cycle of said drive plate means.

16. The improvement in a drive assembly as in claim 15 wherein the film is supplied to the camera in a cartridge having a take-up and a drivable take-up drive gear is arranged in said camera to be enmeshed with said take-up when the cartridge is seated in the camera, said first operating means cooperating with said drivable gear for intermittently driving same.

17. The improvement in a drive assembly as in claim 15 wherein the shutter means includes a shutter setting plate and said second operating means includes a pusher member engageable with said shutter setting plate for intermittently displacing said plate from a fired position to a set position.

18. For a photographic camera having a shutter means and a mechanism for setting the shutter means following an actuation, the improvement comprising:
first means for displacing said shutter means to an open condition;
second means positively displacing said first means for orienting said shutter means to a closed condition;
means restraining said first means in orientation with said shutter means in the open condition;
and means sequencing said second means through at least two cycles for conditioning to again displace said first means for orienting said shutter means to a closed condition.

19. The improvement as in claim 18 wherein said first means is a shutter control plate coupled to said shutter means for driving same responsive to displacement of said plate.

20. The improvement as in claim 19 wherein said second means is a shutter setting plate including means engageable with said shutter control plate for displacing said control plate from a shutter open condition to a shutter closed condition.

21. The improvement as in claim 20 wherein said shutter setting plate is incrementally movable from the orientation at which said shutter control plate is in said shutter closed condition to an orientation permitting said shutter control plate to move to said shutter open condition.

22. The improvement as in claim 20 including spring means urging said shutter control plate toward said shutter open condition.

23. The improvement as in claim 20 including spring means biasing said shutter setting plate for movement of said shutter control plate to said shutter closed condition.

24. The improvement as in claim 23 including means releasably restraining said shutter setting plate against movement by said biasing spring means.

25. The improvement as in claim 18 including spring means biasing said second means for movement in a first direction, and wherein said sequencing means includes a selectively energizeable motor operably coupled to said second means to displace said second means in a second direction against the biasing of said spring means.

26. For a photographic camera having a shutter means and a mechanism for setting the shutter means following an actuation, the improvement comprising:
   shutter control means coupled to said shutter means for displacing said shutter means to and from an open condition and a closed condition;
   shutter setting means for positively displacing said shutter control means to said shutter closed condition;
   means releasing said shutter control means for movement to said shutter open condition;
   means actuatable simultaneously with said releasing means for restraining said shutter setting means in orientation with said shutter control means in said shutter open condition, and releasing said shutter setting means; and
   spring means for driving said shutter setting means to move said shutter control means to said shutter closed condition; and
   means for sequencing said shutter setting means through at least two cycles for conditioning said setting means to a set condition for again displacing said shutter control means to said shutter closed condition and conditioning said spring means.

27. The improvement of claim 26 including spring means coupling said shutter control means to said shutter setting means for driving said shutter control means to said shutter open condition when tensioned, said spring means being tensioned when said sequencing means displaces said shutter setting plate to said set condition.

28. The improvement of claim 26 including means holding said shutter control plate in said shutter closed condition while said sequencing means displaces said shutter setting means to said set condition.

29. The improvement of claim 26 including tongue means locking said shutter setting means in a displaced position following each of said operating cycles of said sequencing means.

30. The improvement of claim 29 wherein said sequencing means is functional but inoperative when said shutter setting means is in said set condition.

* * * * *